United States Patent [19]

Copley et al.

[11] Patent Number: 5,022,957
[45] Date of Patent: Jun. 11, 1991

[54] ETCHING PROCESS FOR IMPROVING THE STRENGTH OF A LASER-MACHINED SILICON-BASED CERAMIC ARTICLE

[75] Inventors: Stephen M. Copley, Palos Verdes; Hongyi Tao, Covina; Judith A. Todd-Copley, Palos Verdes, all of Calif.

[73] Assignee: University of Southern California, Los Angeles, Calif.

[21] Appl. No.: 414,906

[22] Filed: Sep. 29, 1989

[51] Int. Cl.$^5$ .................. B44C 1/22; C03C 15/00; C03C 25/06

[52] U.S. Cl. .................. 156/643; 156/654; 156/663; 65/31; 134/3; 252/79.2

[58] Field of Search ............... 252/79.2; 156/643, 654, 156/657, 663, 667; 219/121.68, 121.69, 121.85; 65/31; 134/3

[56] References Cited

U.S. PATENT DOCUMENTS

| | | | |
|---|---|---|---|
| 3,698,970 | 10/1972 | Galasso et al. | 156/3 |
| 3,742,182 | 6/1973 | Saunders | 219/121.85 |
| 3,909,325 | 9/1975 | Church et al. | 252/79.3 X |
| 3,994,817 | 11/1976 | Quintana | 252/79.3 |
| 4,019,248 | 4/1977 | Black | 357/55 X |
| 4,230,522 | 10/1980 | Martin et al. | 156/638 |
| 4,372,803 | 2/1983 | Gigante | 156/626 |
| 4,666,552 | 5/1987 | Baeuerle | 156/643 |
| 4,758,368 | 7/1988 | Thompson | 252/79.5 |
| 4,781,853 | 11/1988 | Lowry et al. | 252/79.5 |

FOREIGN PATENT DOCUMENTS 63-80989  4/1988  Japan .

OTHER PUBLICATIONS

Yamamoto, Junichi, Yamamoto, Yoshifumi, "Laser Machining of Silicon Nitride," *Proceedings of LAMP '87*, May, 1987, pp. 297–302.

Primary Examiner—William A. Powell
Attorney, Agent, or Firm—Pretty, Schroeder, Brueggemann & Clark

[57] ABSTRACT

A process for improving the strength of laser-machined articles formed of a silicon-based ceramic material such as silicon nitride, in which the laser-machined surface is immersed in an etching solution of hydrofluoric acid and nitric acid for a duration sufficient to remove substantially all of a silicon film residue on the surface but insufficient to allow the solution to unduly attack the grain boundaries of the underlying silicon nitride substrate. This effectively removes the silicon film as a source of cracks that otherwise could propagate downwardly into the silicon nitride substrate and significantly reduce its strength.

12 Claims, 1 Drawing Sheet

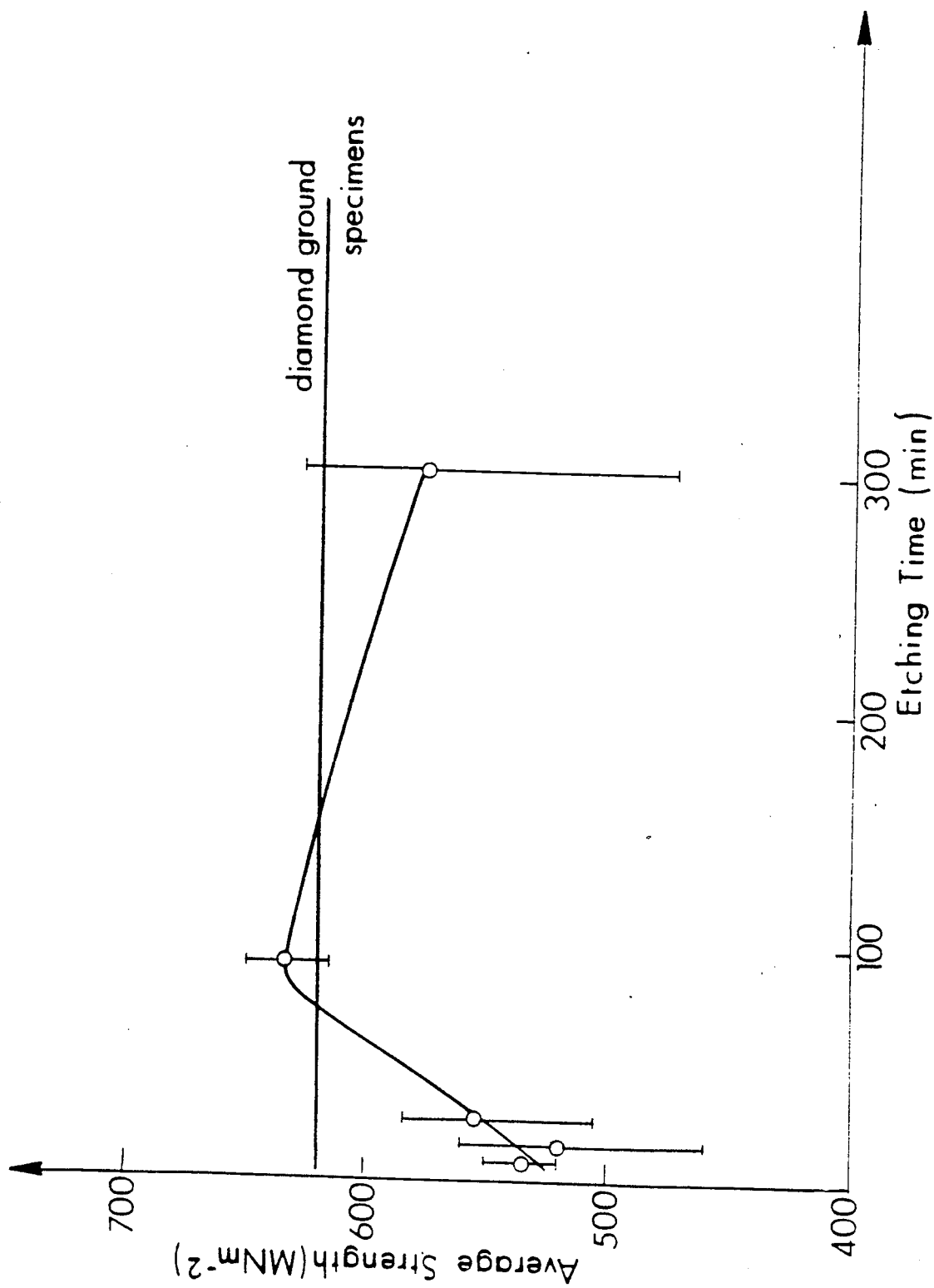

ETCHING PROCESS FOR IMPROVING THE STRENGTH OF A LASER-MACHINED SILICON-BASED CERAMIC ARTICLE

This invention was made with the support of the U.S. Department of Energy, Office of Energy Utilization Research, Energy Conservation and Utilization Technology (ECUT) Program, under subcontract 19X-SA665C awarded by Martin Marietta Energy Systems, Incorporated, acting under contract DE-AC05-840R21400 with the Department of Energy. The Government has certain rights in the invention.

BACKGROUND OF THE INVENTION

This invention relates generally to processes for improving the strength of laser-machined, articles formed of a silicon-based ceramic material and, more particularly, to such processes that utilize chemical etching.

Silicon-based ceramic materials such as silicon nitride ($Si_3N_4$) are attractive materials suitable for structural use at temperatures exceeding 1000° C., because of their high strength and hardness, high Young's modulus, low density, and high oxidation resistance. Ceramic materials such as silicon nitride also have a relatively low thermal expansion coefficient and high thermal conductivity, making them resistant to thermal shock. Silicon nitride can be prepared by hot pressing or hot isostatic pressing, and machining of some kind is frequently required to produce the desired final shape.

One promising technique for machining silicon-based articles utilizes a scanning beam from a $CO_2$ laser. In the case of silicon nitride, the scanning beam heats the material to decompose it into gaseous nitrogen and liquid silicon, with most of the liquid silicon being ejected from the article's surface in the form of droplets. The beam is focused on the article's surface and moved at a generally constant speed, e.g., 200 to 250 centimeters per second, to produce a groove. Periodically moving the article and/or the beam transverse to the scan direction produces a number of overlapping, parallel grooves that together constitute the removal of a layer. The lens focusing the beam is periodically move downwardly so that a series of layers having controlled boundaries are removed, to produce the desired shape. One suitable apparatus for performing laser machining of this kind is described in copending and commonly-assigned U.S. patent application Ser. No. 268,770, filed Nov. 8, 1988, U.S. Pat. No. 4,914,270, and entitled "Method and Apparatus For Shaping Articles Using A Laser Beam." Laser machining of this kind is fast, e.g., one cubic centimeter removed in 200 seconds, and it produces smooth surfaces, e.g., three micron arithmetic average surface roughness, whereby it offers a promising alternative to more conventional diamond grinding for shaping articles formed of silicon nitride.

Although laser machining of silicon nitride articles has been shown to be effective and efficient, it has been found that the average strength of such laser-shaped articles can be 30 to 40 percent lower than that of correspondingly-shaped articles formed using diamond grinding. Although the scatter in strength values appears to be less for the laser-shaped articles than for the diamond-ground articles, the decrease in scatter appears to be insufficient to offset the decrease in allowable stress required by the loss in average strength.

It appears that the loss in strength results from the presence of small cracks in a thin silicon film remaining on the surface of the silicon-based ceramic substrate after laser machining. The film typically has an average thickness of about five microns. Internal stresses brought on by a thermal expansion mismatch between the silicon film and the underlying substrate are believed to cause the cracks to undergo a period of stable growth downwardly into the substrate when an external load is applied. Ultimately, when the external load exceeds a critical value, a failure will occur.

Prior techniques contemplated for removing or otherwise reducing the effects of such small cracks in the silicon film include annealing the articles (e.g., at 1100° C.) in flowing wet oxygen to produce a silicon oxide film, and annealing the articles in dry nitrogen. Although both of these annealing techniques offer substantial improvement in strength, they are considered unduly time consuming and expensive. Another technique for reducing the undesired effect of small cracks in the silicon film is to diamond grind the affected surface to remove the silicon film and a portion of the underlying substrate. This procedure, likewise, is considered unduly expensive. Chemical etching of the laser-machined articles is not necessarily considered a viable alternative because of a concern that the etchant would attack the underlying substrate.

It should, therefore, be appreciated that there is a need for a more convenient and less expensive procedure for improving the strength of laser-machined articles formed of a silicon-based ceramic material such as silicon nitride. The present invention fulfills this need.

SUMMARY OF THE INVENTION

The present invention resides in a process for improving the strength of articles formed of a silicon-based ceramic material such as silicon nitride and having a laser-machined surface, in which a special etching solution is applied to the surface to remove a silicon film that is considered to be the cause of reduced strength. In particular, the process includes a step of applying to the laser-machined surface an etching solution for a time duration sufficient to remove substantially all of any silicon film residue on the surface but insufficient to weaken substantially the grain boundaries of the underlying silicon-based ceramic material. Removal of the silicon film residue prevents small cracks inevitably present in the film from propagating downwardly into the underlying material when the article is stressed.

In other, more detailed features of the invention, the etching solution can consist essentially of hydrofluoric acid, about 25 molar, and nitric acid, about 1 molar. The step of applying the etching solution has a duration of about 100 minutes, which provides in the case of silicon nitride about a 50 percent improvement in its physical strength. The etching process can occur at room temperature.

Other features and advantages of the present invention should become apparent from the following description of the preferred process, taken in conjunction with the accompanying drawing, which illustrates, by way of example, the principles of the invention.

BRIEF DESCRIPTION OF THE DRAWING

The FIGURE is a graph showing the improvement in average strength of laser-machined articles formed of silicon nitride, as a function of etching time in accordance with the preferred process of the invention.

DESCRIPTION OF THE PREFERRED PROCESS

This invention resides in a process for etching the surface of a laser-machined article formed of a silicon-based ceramic material such as silicon nitride ($Si_3N_4$), to improve significantly the article's physical strength. An improvement in strength of about 50 percent can be achieved, giving the etched article a strength comparable to that of more conventional diamond-ground articles.

Prior to the etching process, the silicon nitride article is scanned with a focused beam from a continuous wave $CO_2$ laser having a wavelength of about 10.6 microns. Using an incident beam intensity of about 560 watts, a scan speed of about 240 centimeters per second, and a cross-feed speed of about 0.004 centimeters per scan, a series of parallel, overlapping grooves are formed in the article's surface. The average $e^2$ diameter of the focused beam is about 230 microns, and the parallel grooves formed in the material each have a depth of about 0.1 millimeters. One suitable apparatus for performing this laser machining is described in copending and commonly-assigned U.S. patent application Ser. No. 268,770, filed Nov. 8, 1988, U.S. Pat. 4,914,270, and entitled "Method And Apparatus For Shaping Articles Using A Laser Beam."

The scanning beam heats the silicon nitride to decompose it and form gaseous nitrogen and liquid silicon, with most but not all of the liquid being carried away by the gas. A thin residual film of silicon remains on the laser-machined surface. Upon cooling, small cracks are formed in the silicon film due to a thermal expansion mismatch between the silicon and the underlying silicon nitride substrate. Left untreated, these small cracks can propagate downwardly into the silicon nitride substrate when a tensile stress is applied to the machined surface. This will bring about a structural failure at stresses substantially lower than if the small cracks were not present.

In accordance with the preferred process of the invention, the silicon nitride article containing the laser-machined surface is immersed at room temperature in an etching solution containing hydrofluoric acid and nitric acid. The hydrofluoric acid portion of the solution is preferably about 25 molar, and the nitric acid portion is preferably about 1.1 molar. The etching solution removes substantially all of the silicon film from the surface, thus eliminating the source of the propagating cracks. In particular, the nitric acid is believed to react with the silicon film to produce silicon dioxide, which is then dissolved by the hydrofluoric acid, leaving the underlying silicon nitride substrate substantially intact.

The time duration of the etching process is an important parameter in determining the laser-machined article's ultimate physical strength. Initially, the etching solution attacks only the silicon film, such that the article's strength continues to increase as more of the film is removed. Eventually, however, enough of the silicon film is removed that the underlying silicon nitride material is exposed to the etching solution. Although the solution is not believed to attack the silicon nitride material, itself, the solution is believed to react with certain impurities located in the grain boundaries of this material. These impurities include, for example, silicon, silicon dioxide, and glassy films. This attack of the grain boundaries effectively weakens the silicon nitride article. It is therefore important to terminate the etching process before the reduction in strength brought on by the attack on the grain boundaries exceeds the improvement in strength brought on by further removal of the silicon film.

The FIGURE shows a graph of the silicon nitride material's average strength as a function of etching time. As described above, it will be noted that the strength improves continuously during the initial stages of the etching; however, after about 100 minutes it begins diminishing, indicating that the grain boundaries of the exposed silicon nitride material are beginning to be attacked. Each of the five data point circles on the graph represents the average strength value for several samples tested. The scatter in strength values for each set of samples is indicated by a bracketed vertical line. The average strength value for several samples of diamond ground articles also is shown in the graph, for comparison with the data for the etched laser-machined samples.

It will be noted in the FIGURE that, after about 100 minutes of immersion in the etching solution, the laser-machined article actually has a higher average strength than does the average diamond-ground article. Laser machining, coupled with chemical etching of this kind, thus is believed to be a viable alternative to the more conventional diamond grinding process.

The optimum time duration for the etching process most likely will vary with the concentration of the etching solution, as well as with temperature and other factors. Regardless of what parameter values are utilized, however, the mechanical strength of the processed article likely will exhibit the same general variation with etching time as indicated in the FIGURE. The key to optimization of the etching process is to terminate the process at a time when the article's strength is at or near its peak, i.e., before the etching solution's attack on the silicon nitride grain boundaries begins reducing the article's strength by more than continued removal of the silicon film increases it.

Although the article samples tested in accordance with the preferred process of the invention were limited to silicon nitride, it is expected that the same principles will apply for other hard silicon-based ceramic materials where laser machining of the kind described above leaves a thin silicon film residue on the laser-machined surface. Similarly, the etching solution used on the article samples was limited exclusively to a combination of hydrofluoric acid and nitric acid, in a relative volume proportions of about 90:10. It is expected, however, that other relative proportions and other known silicon etching solutions (e.g., potassium hydroxide) also would function satisfactorily.

It should be appreciated from the foregoing description that the present invention provides a convenient and effective process for improving the strength of laser-machined articles formed of a silicon-based ceramic material such as silicon nitride. Immersing the laser-machined surface of the article in a silicon etching solution such as hydrofluoric acid and nitric acid for a duration sufficient to remove substantially all of a silicon film residue on the surface but insufficient to allow the solution to unduly attack the grain boundaries of the underlying substrate. This effectively removes the silicon film as a source of cracks that otherwise could propagate downwardly into the substrate and significantly reduce its strength.

Although the invention has been described in detail with reference only to the presently preferred process, those of ordinary skill in the art will appreciate that various modifications can be made without departing from the invention. Accordingly, the invention is defined only by the following claims.

We claim:

1. A process for improving the strength of a silicon-based ceramic article having a laser-machined surface, the process comprising a step of applying to the laser-machined surface an etching solution for a duration sufficient to remove substantially all of any silicon film residue on the surface but insufficient to weaken substantially the grain boundaries of the underlying silicon-based ceramic material, such that the strength of the ceramic article is substantially improved.

2. A process as defined in claim 1, wherein the step of applying is performed on a laser-machined article formed of silicon nitride.

3. A process as defined in claim 1, wherein the etching solution consists essentially of hydrofluoric acid, about 25 molar, and nitric acid, about 1 molar.

4. A process as defined in claim 1, wherein the step of applying has a duration of about 100 minutes.

5. A process as defined in claim 1, wherein the step of applying is terminated when the strength of the silicon-based ceramic article has been improved by about 50 percent.

6. A process as defined in claim 1, wherein the step of applying occurs at about room temperature.

7. A process for improving the strength of a silicon nitride article having a laser-machined surface, such surface including overlapping parallel grooves, each having been formed by a single laser scan and having a depth of about 0.1 millimeters, wherein the process comprises a step of immersing the laser-machined surface of the silicon nitride article in an etching solution consisting essentially of hydrofluoric acid and nitric acid for a time duration sufficient to remove substantially all of any silicon film residue on the surface but insufficient to weaken substantially the grain boundaries of the underlying silicon nitride material, such that the strength of the silicon nitride article is substantially improved.

8. A process as defined in claim 7, wherein the etching solution consists essentially of hydrofluoric acid, about 25 molar, and nitric acid, about 1 molar.

9. A process as defined in claim 7, wherein the step of immersing has a duration of about 100 minutes.

10. A process as defined in claim 7, wherein the step of immersing is terminated when the strength of the silicon nitride article has been improved by about 50 percent.

11. A process as defined in claim 7, wherein the step of immersing occurs at about room temperature.

12. A process for improving the strength of a silicon nitride article having a laser-machined surface, such surface including overlapping parallel grooves, each having been formed by a single laser scan and having a depth of about 0.1 millimeters, wherein the process comprises a step of immersing the laser-machined surface of the silicon nitride article at room temperature in an etching solution consisting essentially of hydrofluoric acid and nitric acid for about 100 minutes, to remove substantially all of any silicon film residue on the surface but not to weaken substantially the grain boundaries of the underlying silicon nitride material, whereby the strength of the silicon nitride article is improved by about 50 percent.

* * * * *